(12) United States Patent
Hamers et al.

(10) Patent No.: US 9,019,696 B2
(45) Date of Patent: Apr. 28, 2015

(54) PROTECTION OF FLEXIBLE DISPLAYS

(75) Inventors: Johannes Cornelis Adriaan Hamers, Breugel (NL); Guido Gerard Maria Aelbers, Vught (NL); Nicolaas Aldegonda Jan Maria Van Aerle, Eindhoven (NL); Rik Kruidhof, Eindhoven (NL)

(73) Assignee: Creator Technology B.V., Breda (NL)

( * ) Notice: Subject to any disclaimer, the term of this patent is extended or adjusted under 35 U.S.C. 154(b) by 1174 days.

(21) Appl. No.: 12/995,932

(22) PCT Filed: Jun. 5, 2009

(86) PCT No.: PCT/NL2009/050309
§ 371 (c)(1),
(2), (4) Date: Feb. 28, 2011

(87) PCT Pub. No.: WO2009/148313
PCT Pub. Date: Dec. 10, 2009

(65) Prior Publication Data
US 2011/0140995 A1 Jun. 16, 2011

Related U.S. Application Data

(60) Provisional application No. 61/059,581, filed on Jun. 6, 2008.

(51) Int. Cl.
 H05K 5/00 (2006.01)
 H05K 7/00 (2006.01)
 H04M 1/02 (2006.01)
 G06F 1/16 (2006.01)
 G09F 9/30 (2006.01)

(52) U.S. Cl.
 CPC .......... *H04M 1/0268* (2013.01); *G06F 1/1615* (2013.01); *G06F 1/1652* (2013.01); *G09F 9/301* (2013.01)

(58) Field of Classification Search
 USPC ............... 361/679.01, 679.21, 679.26, 679.3, 361/679.33, 679.55, 679.56
 See application file for complete search history.

(56) References Cited

U.S. PATENT DOCUMENTS

| | | | | |
|---|---|---|---|---|
| 7,558,057 B1* | 7/2009 | Naksen et al. | | 361/679.56 |
| 7,667,962 B2* | 2/2010 | Mullen | | 361/679.56 |
| 8,089,434 B2* | 1/2012 | Moore et al. | | 345/87 |
| 8,106,853 B2* | 1/2012 | Moore et al. | | 345/5 |
| 8,605,421 B2* | 12/2013 | Verschoor et al. | | 361/679.3 |
| 8,644,010 B2* | 2/2014 | Mullen | | 361/679.03 |

(Continued)

FOREIGN PATENT DOCUMENTS

WO   WO 2004/047059 A   6/2004

OTHER PUBLICATIONS

International Search Report for PCT/NL2009/050309 dated Oct. 2, 2009.

*Primary Examiner* — Anthony Haughton

(57) ABSTRACT

According to one aspect, the invention provides a device with a flexible display screen. The flexible display screen is rollable around an axis between a rolled-up state and an unrolled state. For stiffening the screen, stiffening elements are attached to the flexible display screen. The stiffening elements are compressible. They are compressed when the display screen is in a rolled-up state, so as to decrease the size of the rolled-up display device. Therefore, the invention strengthens the display, while at the same time retains a reasonable size of the display in the rolled-up state.

9 Claims, 13 Drawing Sheets

(56) References Cited

U.S. PATENT DOCUMENTS

| | | | |
|---|---|---|---|
| 8,654,519 B2 * | 2/2014 | Visser et al. | 361/679.21 |
| 2006/0038745 A1 * | 2/2006 | Naksen et al. | 345/30 |
| 2007/0241002 A1 | 10/2007 | Wu et al. | |
| 2008/0212271 A1 | 9/2008 | Misawa | |

* cited by examiner

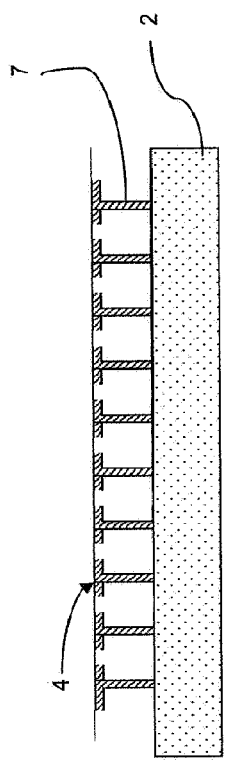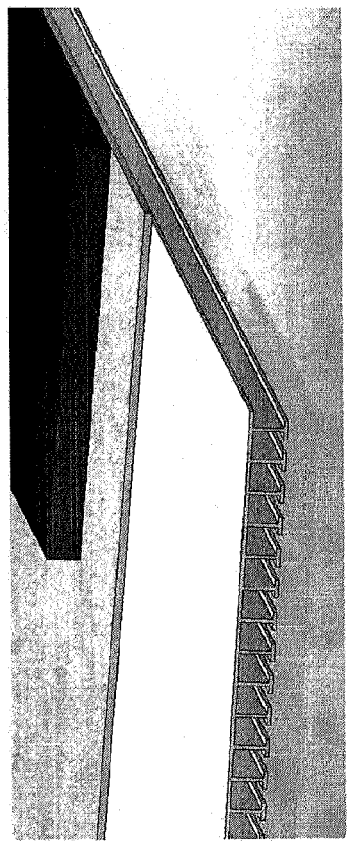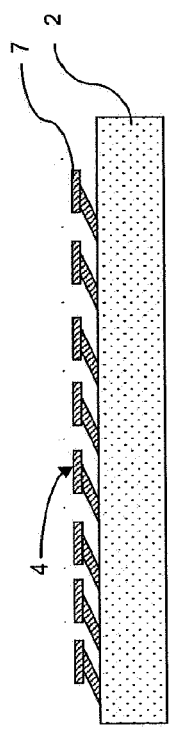
Figure 6A
Figure 6B
Figure 6C

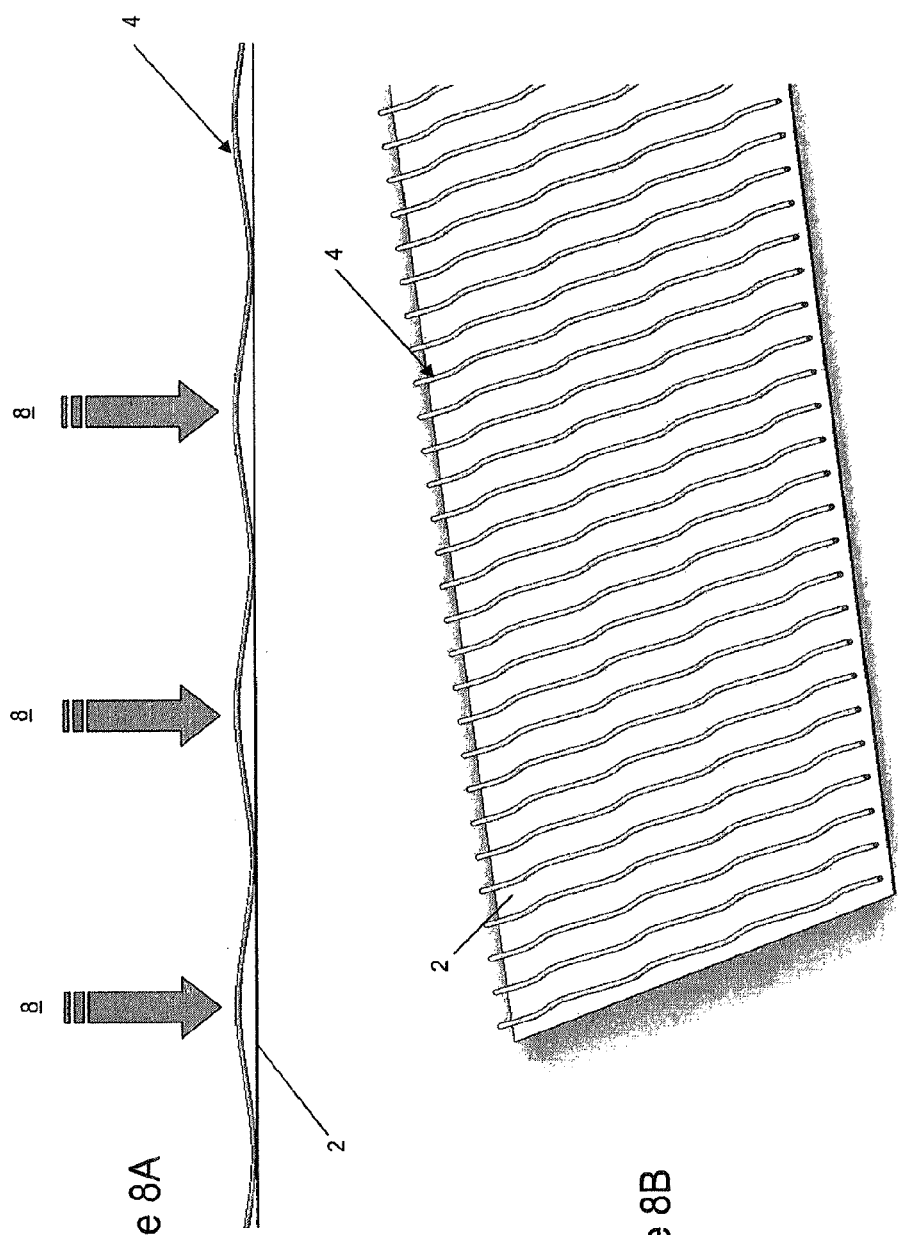

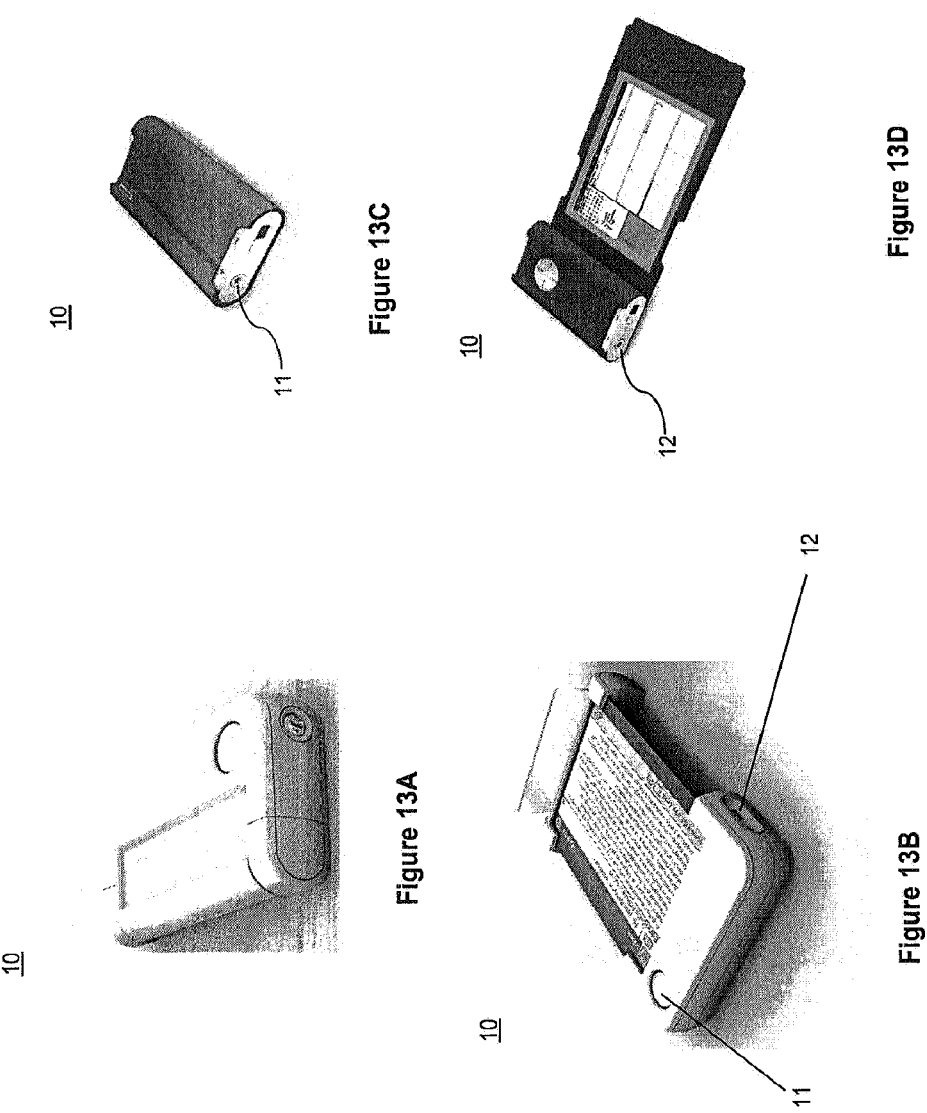

PROTECTION OF FLEXIBLE DISPLAYS

FIELD OF INVENTION

The invention relates to a system for protecting flexible displays.

DESCRIPTION OF PRIOR ART

The present invention relates to the field of manufacturing flexible displays. When the flexible displays are sufficiently thin, they may be curved with a small radius, thus providing a rollable display. An advantage of a rollable display is that it only needs a small storage volume when not in use, thus increasing the portability of the display device.

A drawback of the thin, flexible displays is that they are vulnerable to damage when in use. Pushing the display from the sides or from behind may cause buckling of the display. Buckling introduces small bending radii, resulting in large stresses that may damage the display.

In one aspect, the present invention aims to provide a system to strengthen the flexible display to prevent buckling, while preserving the flexibility of the strengthened display.

Prior art publication 'Flexible display' (WO2004/047059) shows a flexible display device comprising so called distance means to prevent direct contact between the front and back side of the display in a rolled-up state. A side aspect of these distance means is that they strengthen the display when unrolled. The distance means however significantly increase the size of the display device, especially in a rolled-up state. Increase of thickness of the device also occurs with the flexible steel ruler as disclosed in US2004/052037.

Therefore, in another aspect, the invention provides a system for strengthening the display, while at the same time retaining a reasonable size of the display in the rolled-up state.

DISCLOSURE OF THE INVENTION

According to one aspect, the invention provides a flexible display device, comprising a flexible display screen being rollable around an axis between a rolled-up state and an unrolled state; stiffening elements being attached to the flexible display screen for stiffening the screen; characterized in that the stiffening elements are deformable; the elements being flattened when the display screen is in a rolled-up state, so as to decrease the size of the rolled-up display device.

BRIEF DESCRIPTION OF THE DRAWINGS

FIGS. 6A-6C illustrate an embodiment of the invention with T-shaped ridge elements.

FIGS. 8A-8B illustrate an embodiment of the invention wherein stiffening elements are of a wave form.

FIGS. 13A-13D illustrate rollable and wrappable embodiment of the display device according to the invention used in mobile communication devices.

DESCRIPTION OF THE EMBODIMENTS

One aspect of the present invention is a flexible display device (1), comprising a flexible display screen (2); the display screen (2) being rollable around an axis (3) between a rolled-up state and an unrolled state.

An advantage of a rollable display is that it only needs a small storage volume when not in use, thus increasing the portability of the display device (1). Another advantage of flexible displays (and not limited to rollable displays) is that they don't break as easily as displays on a glass substrate.

Figure 1B:
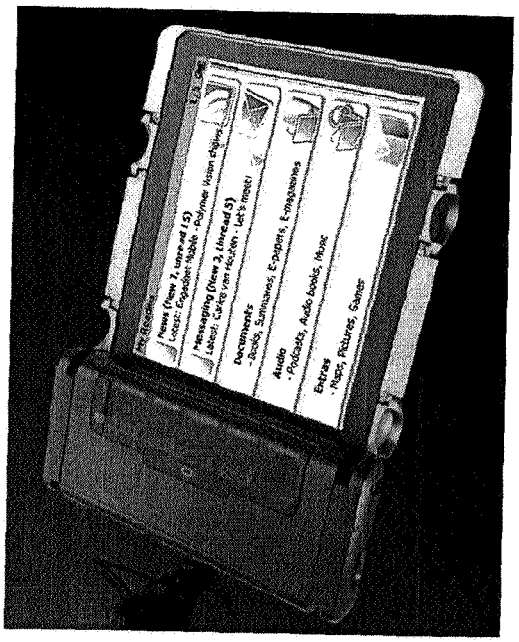
FIGS. 1A and 1B are perspective views of a rollable and a wrappable type of the flexible display according to the invention.
Figure 1A:
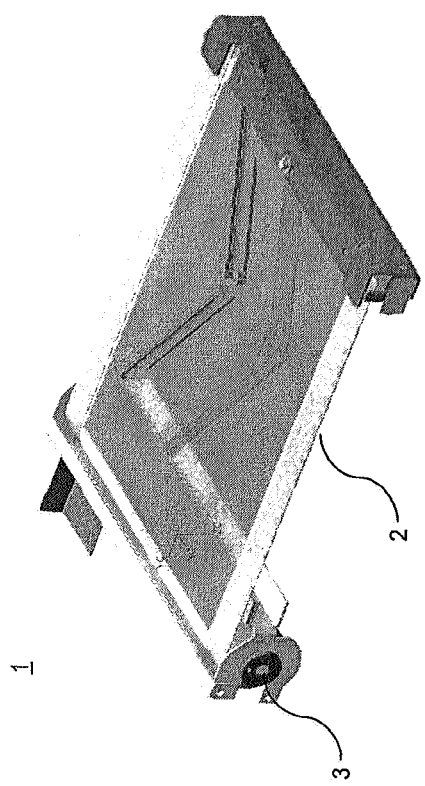

One embodiment of the rollable display device (1) in perspective is shown in FIG. 1A, wherein the display screen (2) is rolled around a cylinder inside the device (1).

It should be noted that the qualification 'rollable' of the display device (1) does not necessarily mean rollable around an axis (3) with a fixed radius; a display device (1) is also considered rollable if the length of the radius varies, depending on the circular angle. The latter mechanism results in another type of display device (1), the so-called 'wrap', shown in FIG. 1B, wherein the display may be wrapped around an (electronic) device such as a mobile phone.

A wrap is described in more detail in publication WO2006085271, published Aug. 17, 2006 which is incorporated in this application by reference.

To strengthen the display, stiffening elements (4) are attached to the display screen (2). The stiffening elements (4) may be glued, but other adhesive techniques, like heat welding are also contemplated. Furthermore the stiffening elements (4) may be attached to the display screen (2) in particular, over a substantial area of the screen's backside while embedded in a layer (8) of flexible material. This will be described later in more detail.

The stiffening elements (4) are deformable, the elements (4) being flattened when the display screen (2) is in a rolled-up state. This will decrease the size of the rolled-up display device (1), substantially in a radial direction. Typically, the stiffening elements (4) may be compressible.

The compressibility characteristics of the stiffening elements (4) may be due to the material the stiffening elements (4) are made from. Another way to create compressibility, even if the material itself is substantially incompressible, is to choose an appropriate shape of the elements (4). A combination of material and shape is also possible.

Preferably, the stiffening elements (4) are positioned extending in a direction substantially parallel to the axis (3). In other words, the elements are positioned substantially axially. This direction provides the best stiffening results, while retaining flexibility in the rolling direction.

It is also possible to position the stiffening elements (4) under an angle relative to the axis (3). Preferably, the angle does not exceed 45 degrees, so as to keep a significant amount of stiffening capacity of the elements (4) parallel to the axis of rotation (3).

In the following, several embodiments of stiffening elements (4) will be described.

Figure 2A:
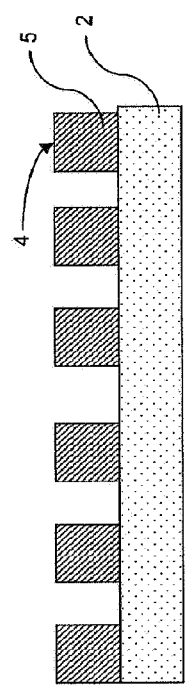
FIGS. 2A-2D illustrate stiffening elements with square, rectangular or (partly) circular shaped cross-section.
Figure 2B:
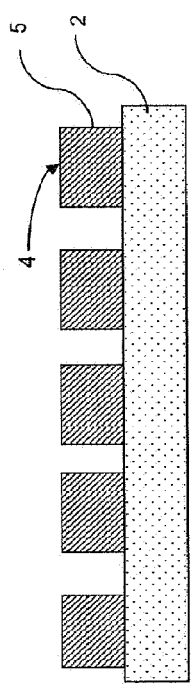

In one embodiment, the stiffening elements (4) are beams (5) having a substantially square (FIG. 2A) or rectangular cross-section (FIG. 2B) in the rolling direction. The square beams (5) are compressible when the display is in the rolled-up state. As an indication: the beams (5) in an uncompressed state have a thickness of 0.3-5 millimeters, whereas in a compressed state, they have a thickness of 0.1-0.5 millimeters.

Figure 2C:
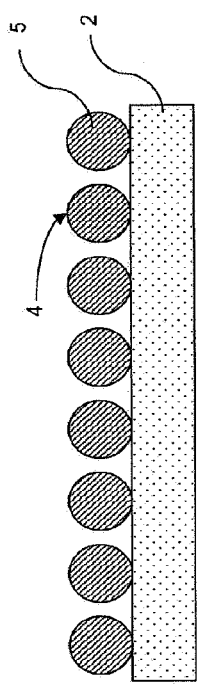
Figure 2D:
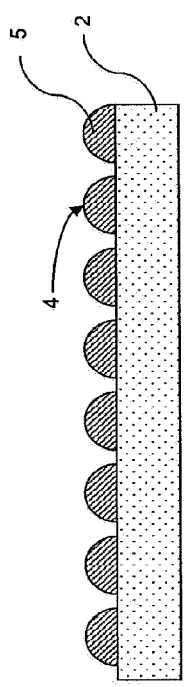
Figure 3A:
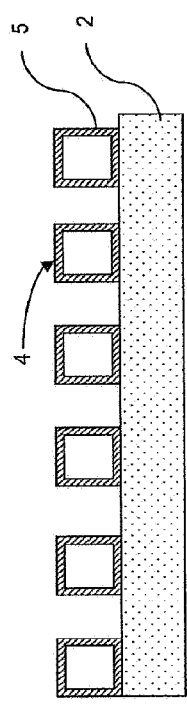
FIGS. 3A-3D illustrate embodiments of the invention with hollow stiffening elements.
Figure 3B:
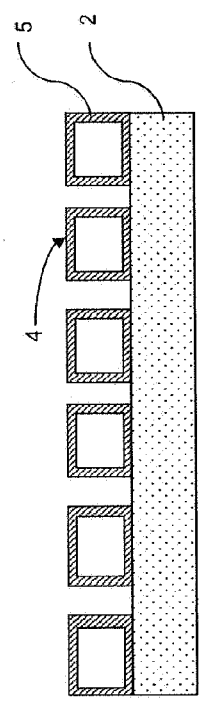
Figure 3C:
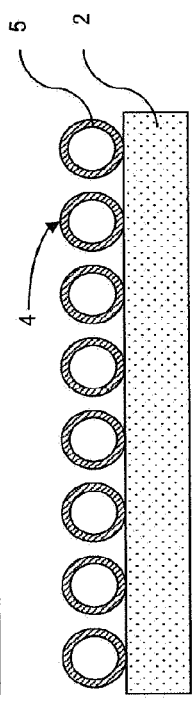
Figure 3D:
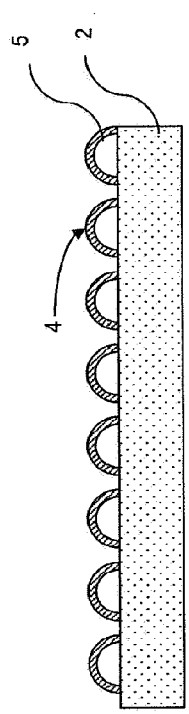

In one embodiment, the stiffening elements (4) are beams (5) having an at least partially circular cross-section in the rolling direction. Examples of (partially) circular beams (5) are illustrated in FIGS. 2C and 2D. FIG. 2C shows beams (5) which are completely circular, the so-called rods. FIG. 2D shows 'semi-circular beams (5)'.

The circular beams (5) have a diameter of approximately 0.1-1 millimeters.

A suitable material to manufacture the beams (5) is plastic. Because the square or rectangular shaped elements (4) provide more stiffness than the circular shaped elements (4), the square or rectangular elements (4) may be made of a softer material than the circular shaped stiffening elements (4) for achieving the same amount of stiffness. An advantage of softer materials is that they do not as easily leave marks on top of the display, as harder materials tend to do.

In one embodiment, the stiffening elements (4) are substantially hollow. As a result, the hollow elements (4) may flatten by tilting towards the display screen (2) in a rolled-up state, thereby increasing the compressibility of the elements (4).

The hollow embodiments are shown in FIG. 3. FIGS. 3A and 3B show the hollow square and rectangular beams (5) respectively. FIG. 3C shows the hollow rods, the so-called straws and FIG. 3D illustrates the semi circular hollow beams (5). The straws have a diameter comparable to the rods.

Hollow circular beams (5), like straws may be made of the same material as solid circular beams (5), like rods. Likewise, hollow square or rectangular beams (5) may be made of the same material as solid square or rectangular beams (5).

Figure 4A:
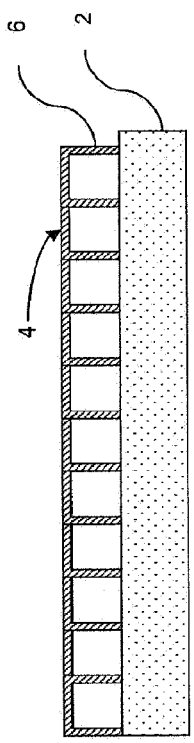
FIGS. 4A-4B illustrate an embodiment of the invention with square shaped profile for stiffening a flexible display.
Figure 4B:
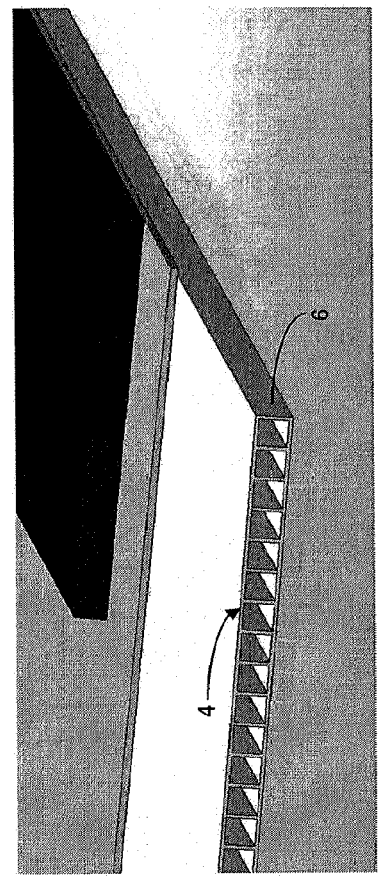

In another embodiment, the hollow square or rectangular stiffening elements (4) are adjacently positioned on the display. They form a square or rectangular profile (6) as shown in FIG. 4, wherein FIG. 4A shows a side view and FIG. 4B a perspective overview of a square profile (6). This profile (6) may flatten by tilting towards the display so as to decrease the size of the display device (1) in a rolled-up state. The profile (6) is attached to the display, e.g. by gluing or heat welding.

It is noted that the square or rectangular profile (6) in an unrolled, unstressed position provides stiffness in both the rolling direction and the direction perpendicular to the rolling direction. This may keep the screen (2) in a flat reading position when unrolled.

Figure 5A:
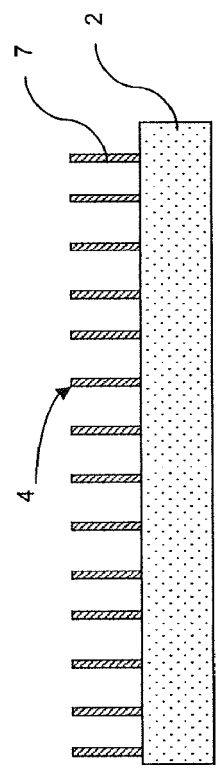
FIGS. 5A-5B illustrate an embodiment of the invention with I-shaped ridge elements.
Figure 5B:
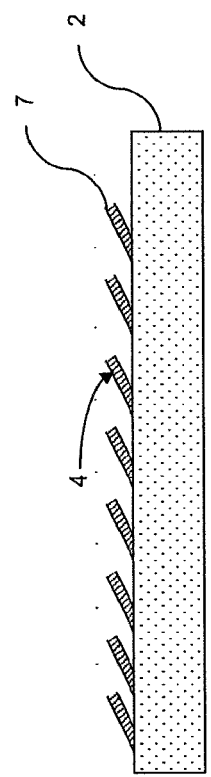

In another embodiment, shown in FIG. 5, the stiffening elements (4) are ridges (7). Ridges (7) are substantially I-shaped. FIG. 5A shows the ridges (7), while upright in an unrolled state and FIG. 5B shows the tilted ridges (7) in a rolled-up position. An advantage of ridges (7), compared to beams (5), is that they are easier tiltable towards the display, to decrease the size of the display device (1) in a rolled-up state.

A disadvantage is that the provided stiffness is relatively weak.

Due to the relatively low stiffness provided by the shape of the I-ridges (7), they may be manufactured from the (harder) material the circular beams (5) are made from.

To increase the stiffness of the I-shaped ridges (7), a substantially flat stiffener may be added at the distal side of each I-shaped ridge, the stiffener being substantially perpendicular to the ridge, so as to create a T-shaped ridge. The T-shape is shown in FIG. 6, wherein FIGS. 6A and 6B show a side view and a perspective overview of the ridges (7) in an unrolled state respectively. The T-shape increases the stiffness of the elements (4), but hardly affects the tiltability towards the display, to decrease the size of the display device (1) in a rolled-up state. The T-shaped ridges (7) in a rolled-up position are shown in FIG. 6C.

Because the shape of the T-ridges (7) provides higher stiffness compared to the I-ridges (7), they may be manufactured from the (softer) material the square beams (5) are made from.

Figure 7A:
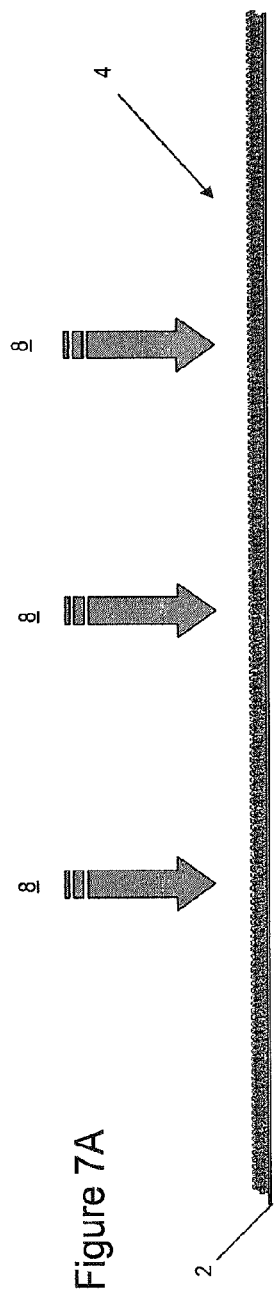
FIGS. 7A-7B illustrate an embodiment of the invention wherein stiffening elements are of a spiral form.
Figure 7B:
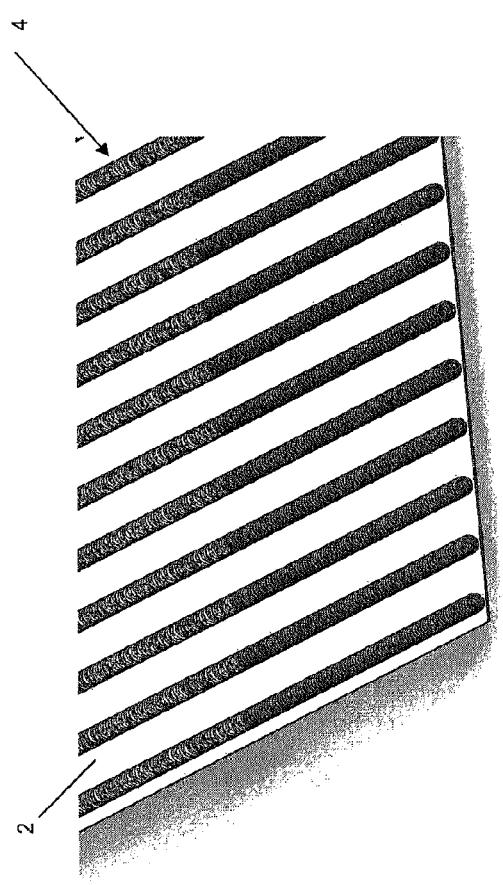

In another embodiment, the stiffening elements (4) are spiral shaped. The spiral shaped elements (4) are shown in FIG. 7, wherein FIG. 7A is a side view of this embodiment. The elements are compressed due to a force (8) exerted on the spiral shaped elements when the display device is in a rolled-up state. FIG. 7B shows a perspective overview of a number of spiral shaped elements positioned on a flexible display screen (2). The spiral or spring like form keeps the elements (4) compressible, even if they are made from an (almost) incompressible material.

An advantage of the spiral form is that elements (4) with this form may be used under a wide range of angles relative to the rolling axis (3) while retaining good compressibility. Another advantage of using spirals is that there may be less of an issue with the alignment than with the other shapes when rolling up. Yet another advantage of spirals is that they are likely to be manufactured more easily than the other shapes in these small sizes.

In yet another embodiment, the stiffening elements (4), e.g. rods or bars are wave shaped. The wave shaped elements (4) are shown in FIG. 8, wherein FIG. 8A is a side view of this embodiment. The wave shaped elements may be compressed or flattened due to a force (8) exerted on the elements when the display device is in a rolled-up state. FIG. 8B shows a perspective overview of a number of wave shaped elements positioned on a flexible display screen (2). The wave form keeps the elements (4) compressible, even if they are made from an (almost) incompressible material. An advantage of using wave shaped elements is that they add height to the construction for additional stiffness, but limit the rolled-up thickness and the weight of the device (1).

Figure 9A:
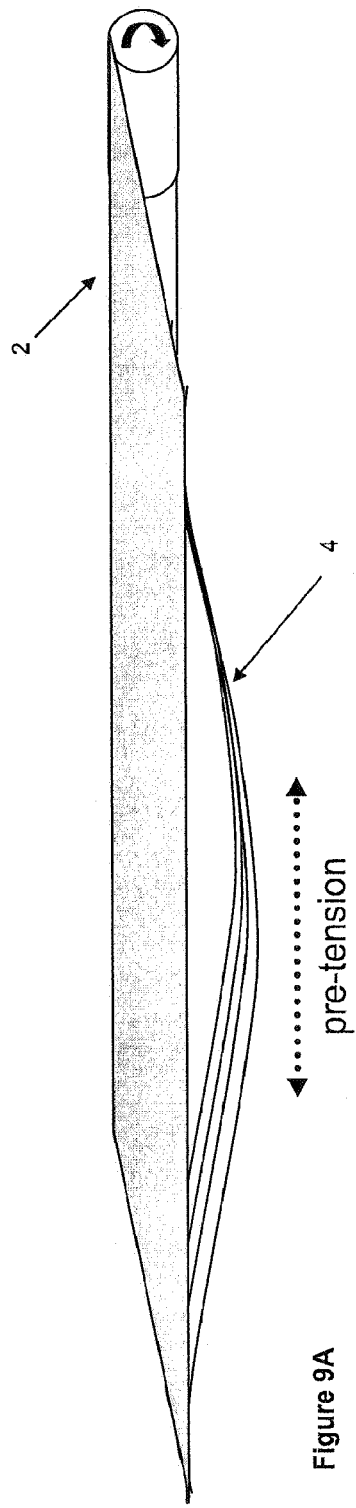
FIGS. 9A-9B illustrate an embodiment of the invention wherein stiffening elements are resilient and pre-stressed.
Figure 9B:
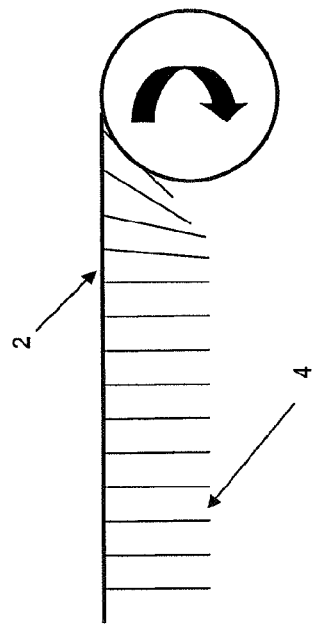

In another embodiment, illustrated in FIG. 9, the stiffening elements (4) are resilient and pre-stressed in the stiffening direction to increase the stiffness of the display screen (2). FIG. 9A shows an overview, wherein the stiffening elements (4) are attached to the screen (2) and wherein the direction of the pre-tension is indicated. Due to the pre-tension, the elements (4) may form the screen (2) of the display in a slightly hollow or rounded manner (not shown). FIG. 9B, a side view, illustrates the rolling-up of the pre-stressed elements (4) depicted in FIG. 9A. As can be seen, during rolling-up, the elements turn over towards the screen in the rolling direction. Pre-stressing may be applied with all the embodiments of stiffening elements mentioned, e.g. with beams (hollow or solid), ridges, spirals and wave shaped rods or bars.

In the embodiments described above, the stiffening elements (4) are attached to the back of the display screen (2). In the following embodiments, a layer (9) of flexible material is provided between the display screen (2) and the elements (4).

A function of the flexible layer (9) is to form a pressure distributing layer (9). This layer (9) distributes the pressure due to forces applied to the display screen (2), e.g. when touching the screen (2), thus preventing damage due to high pressures. Another way of preventing damage due to high pressure is to attach the display screen (2) suspended.

Another function of the flexible layer (9) is to prevent the stiffening elements (4) from taking shape through the display screen (2) and thus from influencing the viewing surface of the display. This problem of shape-through depends on the specific size and shape of the stiffening elements (4). Slender elements (4) seem not to suffer from inconvenient shape-through.

A material especially suited for the layer (9) of flexible material is foamed plastic.

Because the neutral rolling line runs through the display screen (2) and not through the flexible layer (9), the flexible layer (9) will be slightly compressed in a rolled-up state.

To provide both pressure distribution functionality and increased stiffness of the display screen (2), a combination of a flexible layer (9) and stiffening elements (4) may be used.

Figure 10A:
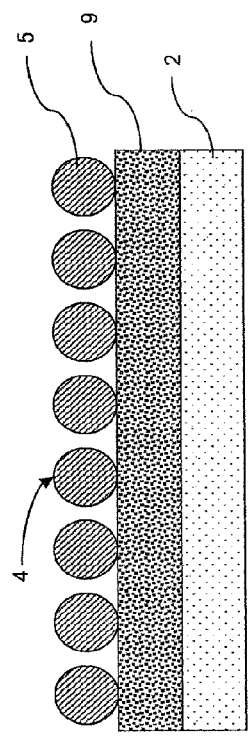
FIGS. 10A-10B illustrate embodiments of the invention wherein stiffening elements are attached to a layer of flexible material.
Figure 10B:
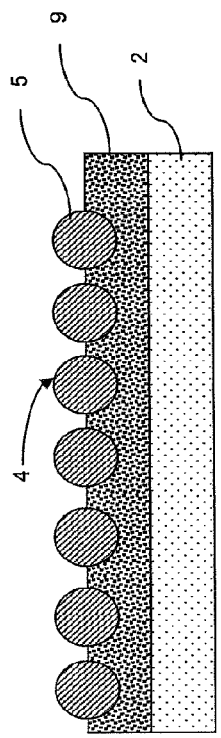

In one embodiment, the stiffening elements (4) are attached to the layer (9) of flexible material. As a consequence, the stiffening elements (4) are at least partially pushed into the flexible material when the display screen (2) is in a rolled-up state. This decreases the size of the rolled-up display device (1). FIG. 10A shows rod shaped elements (4) attached to a flexible layer (9) in the unrolled position. FIG. 10B illustrates the rods partly pressed into the flexible layer (9) in the rolled-up state.

Figure 11A:
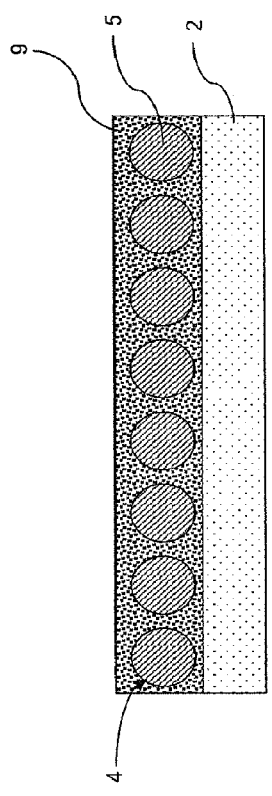
FIGS. 11A-11B illustrate an embodiment of the invention wherein solid rods are embedded in a layer of flexible material.
Figure 11B:
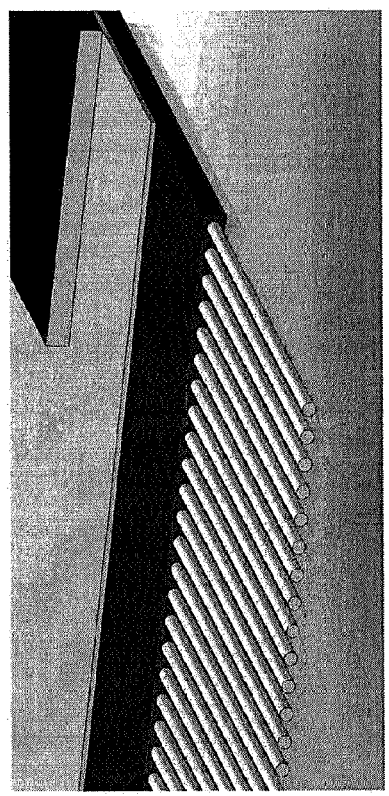
Figure 12A:
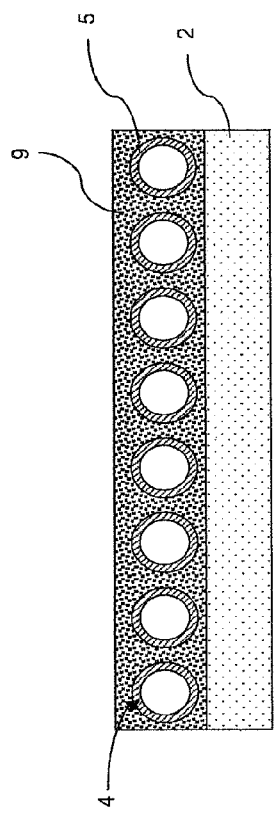
FIGS. 12A-12B illustrate an embodiment of the invention wherein hollow straws are embedded in a layer of flexible material.
Figure 12B:
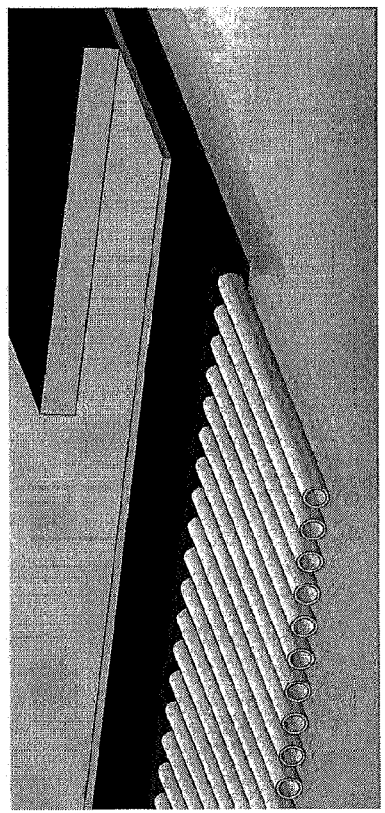

In yet another embodiment, the stiffening elements (4) are embedded in a layer (9) of flexible material. An example of this embodiment, wherein the embedded stiffening elements (4) are solid rods is shown in FIG. 11. FIG. 11A shows a side view and FIG. 11B a perspective overview of the embodiment. Embedded hollow straws are shown in FIG. 12. FIG. 12A shows a side view and FIG. 12B shows an overview of the embodiment.

It should be noted that in some embodiments also (besides the layer (9) of flexible material) the stiffening elements (4) provide a certain pressure distributing functionality, especially the hollow elements (4). Where the solid rods merely provide stiffness, the (hollow) straws provide stiffness and a pressure distributing functionality. This is advantageous for the total thickness of the total stiffening and pressure distributing layer (9).

As an example, the thickness of a flexible layer (9) with solid and hollow rods will be considered. Suppose a layer (9) of flexible material with thickness d1 provides sufficient pressure distribution for the display to prevent damage. The solid rods that provide stiffness have a thickness d2. Because the solid rods hardly add any pressure distributing capacity, the total thickness is d1+d2.

When the stiffness is provided by (hollow) straws with diameter d2, these straws also provide pressure distributing functionality. This means that the pressure distributing functionality provided by the layer (9) of flexible material may be less in order to reach the same total pressure distributing functionality as in the previous case. As a result, the flexible layer (9) may be thinner than d1 and thus the total thickness may be less than d1+d2.

The rollable display device (1), as described in the above may be used in the field of mobile communication apparatuses (9). FIG. 13 shows a perspective view of an example of both a rollable and a wrappable embodiment of the display device (1) as used in mobile communication devices. FIGS. 13A and 13B show the rollable embodiment in a closed and an open position respectively.

FIGS. 13C and 13D show the wrappable embodiment in a rolled-up and unrolled state respectively. In this example, the display is wrapped around an (electronic) apparatus (10) such as a mobile phone. The display is turned around the body of the apparatus (10), wherein the number of turns depends on the size of the display screen (2): the bigger the screen, the more turns. FIG. 13 also shows a button (11) to switch the apparatus (10) on and off, a navigator-button and a connector (12) to charge the battery of the mobile apparatus (10).

To protect the display when the wrap is not in use, the display is wrapped with its view-side to the inside. Other examples of electronic apparatuses (9) are video players and navigation systems.

The detailed drawings, specific examples and particular formulations given, serve the purpose of illustration only. Furthermore, other substitutions, modifications, changes, and omissions may be made in the design, operating conditions, and arrangement of the exemplary embodiments without departing from the scope of the invention as expressed in the appended claims.

The invention claimed is:

1. A flexible display device, comprising:
a flexible display screen rollable around an axis between a rolled-up state and an unrolled state;
a layer of flexible material, wherein the layer of flexible material is attached to the display screen so as to form a pressure distributing layer; and
stiffening elements attached to the flexible display screen for stiffening the screen, wherein the stiffening elements are embedded in the layer of flexible material;
wherein the stiffening elements are deformable, and the stiffening elements are flattened when the display screen is in a rolled-up state, so as to decrease the size of the rolled-up display device.

2. The flexible display device according to claim 1, wherein the stiffening elements are positioned extending in a direction substantially parallel to the axis.

3. The flexible display device according to claim 1, wherein the stiffening elements are compressible.

4. The flexible display device according to claim 3, wherein the stiffening elements are substantially hollow, so as to increase the compressibility of the elements.

5. The flexible display device according to claim 1, wherein the layer of flexible material is made of foamed plastic.

6. A mobile communication apparatus comprising the flexible display device according to claim 1.

7. The flexible display device according to claim 1, wherein the stiffening elements comprise hollow rods embedded in the layer of flexible material.

8. The flexible display device according to claim 1, wherein the material of the stiffening elements is deformable.

9. The flexible display device according to claim 1, wherein the stiffening elements comprise solid rods embedded in the layer of flexible material.

* * * * *